No. 734,909. PATENTED JULY 28, 1903.
M. MacLEAN.
PARING KNIFE.
APPLICATION FILED MAY 14, 1902.
NO MODEL.
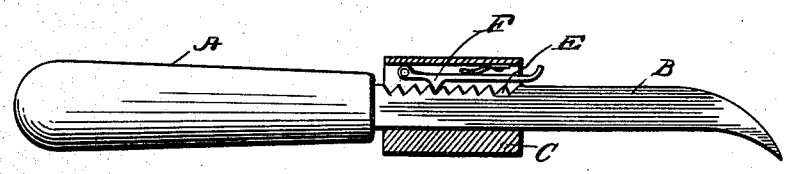
WITNESSES:
Bernard M. Offutt
W. G. Crowley
INVENTOR
Margaret MacLean
BY
David F. Moore
ATTORNEY No. 734,909.

Patented July 28, 1903.

UNITED STATES PATENT OFFICE.

MARGARET MacLEAN, OF JAMAICA PLAINS, MASSACHUSETTS.

PARING-KNIFE.

SPECIFICATION forming part of Letters Patent No. 734,909, dated July 28, 1903.

Application filed May 14, 1902. Serial No. 107,238. (No model.)

*To all whom it may concern:*

Be it known that I, MARGARET MacLEAN, a citizen of the United States, residing at Jamaica Plains, in the county of Suffolk and State of Massachusetts, have invented certain new and useful Improvements in Paring-Knives, of which the following is a specification.

My invention relates to improvements in paring-knives; and the main object of my invention is the provision of a knife which is provided with an adjustable attachment to be engaged by the thumb of the operator while paring fruits and vegetables.

Another object of my invention is the provision of a knife having mounted thereon near the handle a device which will protect the operator's thumb and will also furnish a place to receive pressure to assist in paring.

To attain the desired objects, the invention consists of a paring-knife embodying novel features of construction, substantially as disclosed herein.

In the accompanying drawing I have illustrated a side elevation of a paring-knife with my attachment in section thereon.

Referring to the drawing, A designates the handle, in which is mounted in the usual manner the knife-blade B, which is made in any desired shape, preferably as shown.

To render the knife desirable for paring fruits and vegetables, I provide a guard C, which may be secured upon the knife-blade near the end of the handle, so that the guard instead of the blade may be grasped by the operator without in any way endangering the operator's hand. I provide the knife-blade with the teeth E, which are adapted to be engaged by the spring-actuated detent F, carried by the guard, thus allowing the guard to slide upon the blade and be locked at any desired adjustment.

From the foregoing description, taken in connection with the drawing, the simplicity, durability, and inexpensiveness of the device are readily understood and its efficiency and practicability are readily seen.

What I claim as new, and desire to secure by Letters Patent, is—

1. A paring-knife, comprising a handle, a blade rigidly fixed therein provided with a series of teeth upon the upper edge thereof, a guard slidably mounted upon the blade, and spring-actuated means carried by the guard adapted to engage said teeth and hold the guard in adjusted position.

2. A paring-knife, comprising a handle, a blade rigidly fixed therein provided with a series of teeth upon the upper edge thereof, a guard slidably mounted upon the blade, and a spring-actuated detent carried by the guard adapted to engage the said teeth.

3. A paring-knife, comprising a handle, a blade mounted therein provided with a series of teeth upon the edge near the handle, a cylindrical guard slidably mounted upon said blade provided with a channel or recess upon one side thereof in alinement with the toothed edge of the blade, a detent having one end pivotally mounted on the guard within said channel having a tooth adapted to engage the teeth of the blade and provided with an outward extension which extends beyond one end of the guard, and a spring mounted within the guard engaging the detent to normally hold its tooth in engagement with the teeth of the blade.

In testimony whereof I affix my signature in presence of two witnesses.

MARGARET MacLEAN.

Witnesses:
RICHARD WOODS,
JOHN E. LEE.